United States Patent
Liu

(10) Patent No.: US 9,933,900 B2
(45) Date of Patent: Apr. 3, 2018

(54) SENSING ELECTRODE GROUP AND SENSED CAPACITANCE ESTIMATION METHOD AND APPARATUS

(71) Applicant: MStar Semiconductor, Inc., Hsinchu, Hsien (TW)

(72) Inventor: Tzu-Wei Liu, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 158 days.

(21) Appl. No.: 14/794,981

(22) Filed: Jul. 9, 2015

(65) Prior Publication Data

US 2016/0011693 A1    Jan. 14, 2016

(30) Foreign Application Priority Data

Jul. 9, 2014   (TW) .............................. 103123601 A

(51) Int. Cl.
*G06F 3/041* (2006.01)
*G06F 3/044* (2006.01)

(52) U.S. Cl.
CPC .................................... *G06F 3/044* (2013.01)

(58) Field of Classification Search
CPC .......... G06F 3/041–3/047; G06F 2203/04103; G06F 2203/04107; G06F 2203/04111–2203/04113; H03K 2017/9602; H03K 17/962
See application file for complete search history.

(56) References Cited

U.S. PATENT DOCUMENTS

| | | | | |
|---|---|---|---|---|
| 2006/0097991 A1* | 5/2006 | Hotelling | .............. | G06F 3/0416 345/173 |
| 2008/0252608 A1* | 10/2008 | Geaghan | ................. | G06F 3/044 345/173 |
| 2008/0259044 A1* | 10/2008 | Utsunomiya | ........... | G06F 3/044 345/173 |
| 2009/0267916 A1* | 10/2009 | Hotelling | ................ | G06F 3/044 345/174 |
| 2009/0314621 A1* | 12/2009 | Hotelling | .............. | G06F 3/0416 200/600 |
| 2010/0013800 A1* | 1/2010 | Elias | ..................... | G06F 3/0418 345/178 |

(Continued)

FOREIGN PATENT DOCUMENTS

CN            102243555           11/2011

*Primary Examiner* — Roberto Flores
(74) *Attorney, Agent, or Firm* — WPAT, PC

(57) ABSTRACT

A sensing electrode group formed on a substrate of a touch apparatus includes a plurality of sensing electrode unit pairs arranged along a first direction. Each sensing electrode unit pair includes a first sensing electrode unit and a second sensing electrode unit corresponding to the first sensing electrode unit. The first sensing electrode unit includes at least one first electrode, at least one corresponding second electrode, a first conducting wire and a second conducting wire. The second sensing electrode unit includes at least one third electrode, at least one corresponding fourth electrode, a third conducting wire and a fourth conducting wire. The first and second sensing electrode units are arranged along a second direction, and the third and fourth conducting wires are routed along the second direction next to the first sensing electrode unit.

18 Claims, 11 Drawing Sheets

(56) References Cited

U.S. PATENT DOCUMENTS

| | | | |
|---|---|---|---|
| 2010/0289774 A1* | 11/2010 | Pan | G06F 3/044 345/175 |
| 2010/0321326 A1* | 12/2010 | Grunthaner | G06F 3/044 345/174 |
| 2011/0141051 A1* | 6/2011 | Ryu | G06F 3/044 345/173 |
| 2011/0187666 A1* | 8/2011 | Min | G06F 3/041 345/173 |
| 2012/0200530 A1* | 8/2012 | Wu | G06F 3/044 345/174 |
| 2012/0227259 A1* | 9/2012 | Badaye | G06F 3/044 29/846 |
| 2013/0141368 A1* | 6/2013 | Wang | G06F 3/044 345/173 |
| 2014/0204051 A1* | 7/2014 | Park | G06F 3/0412 345/174 |
| 2014/0313169 A1* | 10/2014 | Kravets | G06F 3/044 345/178 |
| 2015/0116254 A1* | 4/2015 | Solven | G06F 3/044 345/174 |

* cited by examiner

SENSING ELECTRODE GROUP AND SENSED CAPACITANCE ESTIMATION METHOD AND APPARATUS

This application claims the benefit of Taiwan application Serial No. 103123601, filed Jul. 9, 2014, the subject matter of which is incorporated herein by reference.

BACKGROUND OF THE INVENTION

Field of the Invention

The invention relates in general to a touch panel, and more particularly, to a sensing electrode group and a sensed capacitance estimation method and apparatus on a touch panel.

Description of the Related Art

Touch panels make a large scale industry. Various electronic products adopt touch panels as critical input/output devices for human-machine interfaces. The performance of touch panels depends on sensing electrodes and logic circuits connected thereto. Thus, the design and quality of the sensing electrodes greatly affect the performance of touch panels.

The sensing electrodes of a touch panel are generally formed on a transparent substrate. Light emitted from a display device penetrates the transparent substrate to reach a user. These sensing electrodes formed on the transparent substrate include multiple electrodes, which are connected to the logic circuits via multiple conducting wires.

With the constant increase resolution demand on display devices, the performance requirements of touch panels also become higher. To provide better performances, including the resolution, precision, sensing speed for fast-moving objects, for touch devices, more electrodes and conducting wires need to be fit into a limited touch area.

Therefore, there is a need for a good sensing electrode design that satisfies requirements for the increasingly higher performance and ever reducing touch panel sizes.

SUMMARY OF THE INVENTION

A sensing electrode group formed on a substrate of a touch apparatus is provided according to an embodiment of the present invention. The sensing electrode includes a plurality of sensing electrode pairs arranged along a first direction. Each of the sensing electrode pairs includes a first sensing electrode unit and a second sensing electrode unit corresponding to the first sensing electrode unit. The first sensing electrode unit includes at least one first electrode, at least one second electrode corresponding to the at least one first electrode, a first conducting wire connected to the at least one first electrode, and a second conducting wire connected to the at least one second electrode. The second electrode unit includes at least one third electrode, at least one fourth electrode corresponding to the third electrode, a third conducting wire connected to the at least one third electrode, and a fourth conducting wire connected to the at least one fourth electrode. The first sensing electrode unit and the second sensing electrode unit are arranged along a second direction. The third conducting wire and the fourth conducting wire are routed along the second direction next to the first sensing electrode unit.

A sensing electrode unit pair formed on a substrate of a touch apparatus is provided according to another embodiment of the present invention. The sensing electrode unit pair includes a first sensing electrode unit and a second sensing electrode unit corresponding to the first sensing electrode unit. The first sensing electrode unit includes at least one first electrode, at least one second electrode corresponding to the at least one first electrode, a first conducting wire connected to the at least one first electrode, and a second conducting wire connected to the at least one second electrode. The second electrode unit includes at least one third electrode, at least one fourth electrode corresponding to the third electrode, a third conducting wire connected to the at least one third electrode, and a fourth conducting wire connected to the at least one fourth electrode. The third conducting wire and the fourth conducting wire are routed along the second direction next to the first sensing electrode unit.

An estimation method for sensed capacitance is provided according to another embodiment of the present invention. The estimation method is applied to a sensing electrode form at a substrate of a touch apparatus. The sensing electrode includes a plurality of sensing electrode unit pairs arranged along a first direction. Each of the sensing electrode unit pairs includes a first sensing electrode unit and a second sensing electrode unit corresponding to the first sensing electrode unit. The second sensing electrode unit includes a third conducting wire and a fourth conducting wire. The first sensing electrode unit and the second sensing electrode unit are arranged along a second direction. The third conducting wire and the fourth conducting wire are routed along the second direction next to the first sensing electrode unit. The estimation method includes steps of: calculating a first-direction coordinate value of a proximity event according to a plurality of capacitance changes sensed by the first sensing electrode units of the sensing electrode unit pairs; obtaining at least one sensed capacitance ratio of at least one first sensing electrode unit to the corresponding third conducting wire and fourth conducting wire according to the first-direction coordinate value of the proximity event; and calculating a sensed capacitance value of the third conducting wire and the fourth conducting wire according to the capacitance change sensed by the at least one first sensing electrode unit and the sensed capacitance ratio of the at least one first sensing electrode unit to the corresponding third conducting wire and fourth conducting wire.

An estimation apparatus for sensed capacitance is provided according to another embodiment of the present invention. The estimation apparatus is applied to a sensing electrode connected and formed on a substrate of a substrate of a touch apparatus. The sensing electrode is same as a sensing electrode described in an embodiment in FIG. 12. The estimation apparatus includes a first-direction coordinate calculating module, configured to calculate a first-direction coordinate value of a proximity event according to a plurality of capacitance changes sensed by first sensing electrodes of the sensing electrode unit pairs; a sensed capacitance ratio obtaining module, configured to obtain a sensed capacitance ratio of at least one first sensing electrode unit to the corresponding third and fourth conducting wires; and a sensed capacitance value estimating module, configured to calculate the sensed capacitance value of the third conducting wire and the fourth conducting wire according to the capacitance change sensed by the at least one first sensing electrode unit and the sensed capacitance ratio of the at least one first sensing electrode unit to the corresponding third conducting wire and fourth conducting wire.

The above and other aspects of the invention will become better understood with regard to the following detailed description of the preferred but non-limiting embodiments. The following description is made with reference to the accompanying drawings.

DETAILED DESCRIPTION OF THE INVENTION

Embodiments of the present invention are described in detail below. Apart from the disclosed embodiments, the present invention is also applicable to other embodiments. The scope of the present invention is not limited by these non-limiting embodiments, and is defined in accordance with the appended claims. To better describe the contents of the present invention to one person skilled in the art and to keep the drawings clear, parts of the drawings are not drawn to actual sizes and ratios, and certain sizes and other associated scales may be emphasized to appear exaggerated, with unrelated details not entirely depicted.

Figure 1:
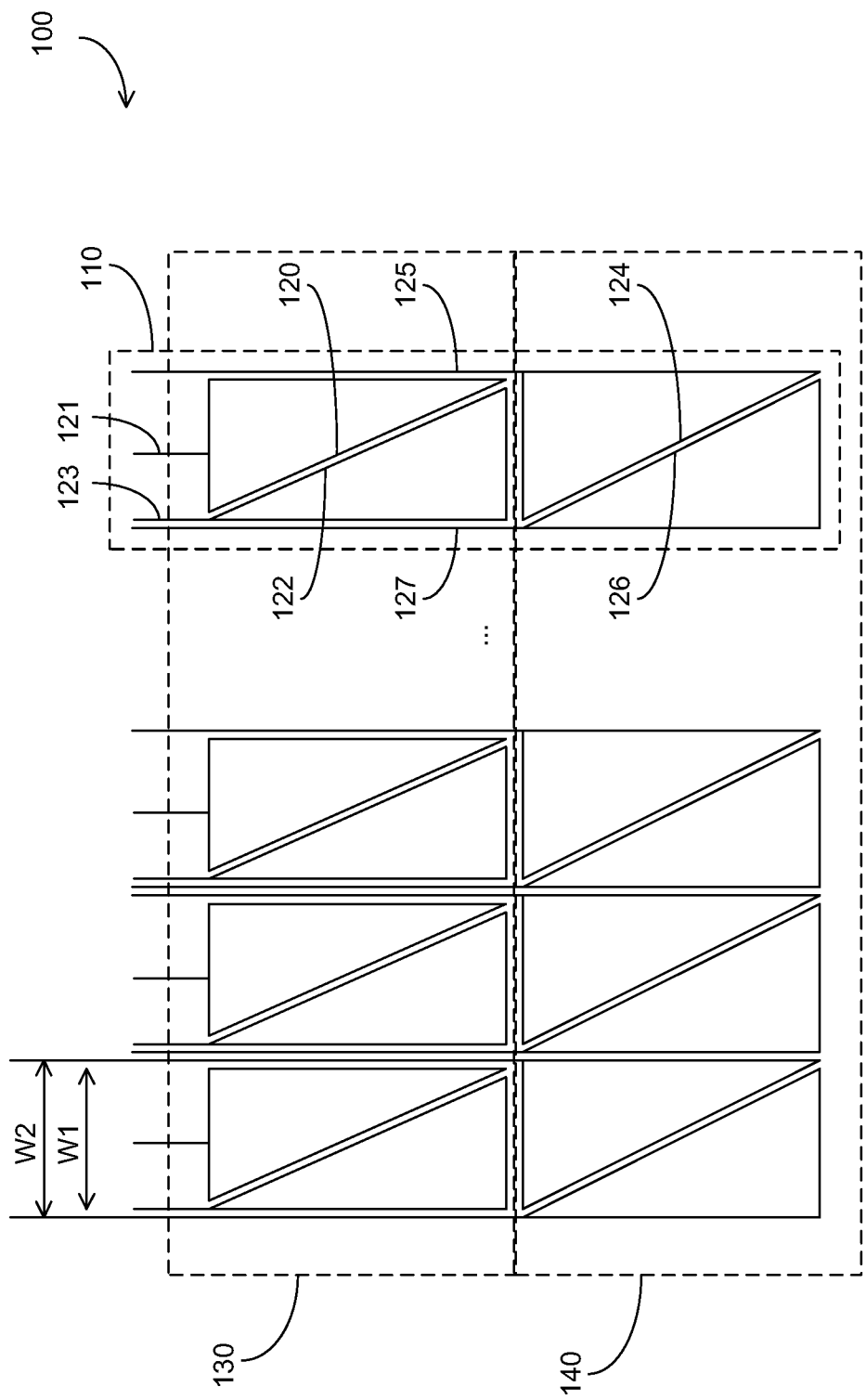
FIG. 1 is a schematic diagram of a sensing electrode according to an embodiment of the present invention.

FIG. 1 shows a schematic diagram of a sensing electrode group 100 according to an embodiment of the present invention. The sensing electrode group 100 may be formed on a substrate (not shown) of a touch apparatus, e.g., on a surface of the substrate or within the substrate. Properties of the substrate are not limited in the present invention. For example, the properties of the substrate include the shape, structure and material of the substrate.

The sensing electrode group 100 includes a plurality of sensing electrode unit pairs 110 arranged along a first direction (e.g., the horizontal direction or the X-axis direction). Each of the sensing electrode unit pairs 100 includes at least two sensing electrode units arranged along a second direction (e.g., the vertical direction or the Y-axis direction), with the upper sensing electrode referred to as a first sensing electrode unit and the lower sensing electrode unit referred to as a second sensing electrode unit. All of the first sensing electrode units form a first sensing electrode row 130 along the first direction, and all of the second sensing electrode units similarly form a second sensing electrode row 140 along the first direction. The first sensing electrode row 130 is correspondingly parallel to the second sensing electrode row 140.

The first sensing electrode unit includes at least one first electrode 120, a second electrode 122 corresponding to the at least one first electrode 120, a first conducting wire 121 connected to the at least one first electrode 120, and a second conducting wire 123 connected to the at least one second electrode 122. The second sensing electrode unit includes at least one third electrode 124, a fourth electrode 126 corresponding to the at least one third 124, a third conducting wire 125 connected to the at least one third electrode 124, and a fourth conducting wire 127 connected to the at least one fourth electrode 126. The planar contours of the electrodes 120, 122, 124 and 126 are not limited, and may be one of a triangle, a trapezoid similar to a triangle, and a polygon. As shown in FIG. 1, the first conducting wire 121, the second conducting wire 123, the third conducting wire 125 and the fourth conducting wire 127 are connected along the second direction to a logic circuit of the touch apparatus.

In the embodiment in FIG. 1, the first sensing unit has a width W1 in the first direction, the second sensing unit has a width W2 in the first direction, and W2 is greater than W1. As shown in FIG. 1, the third conducting wire 125 and the fourth conducting wire 127 of the second sensing unit extend along the second direction, i.e., along two sides of the first sensing unit, to connect to a logic circuit in the touch apparatus, as the first conducting wire 121 and the second conducting wire 123. Thus, the widths of the third electrode 124 and the fourth electrode 126 of the second sensing unit are wider than the first electrode 120 and the second electrode 122 of the first sensing electrode.

Figure 2:
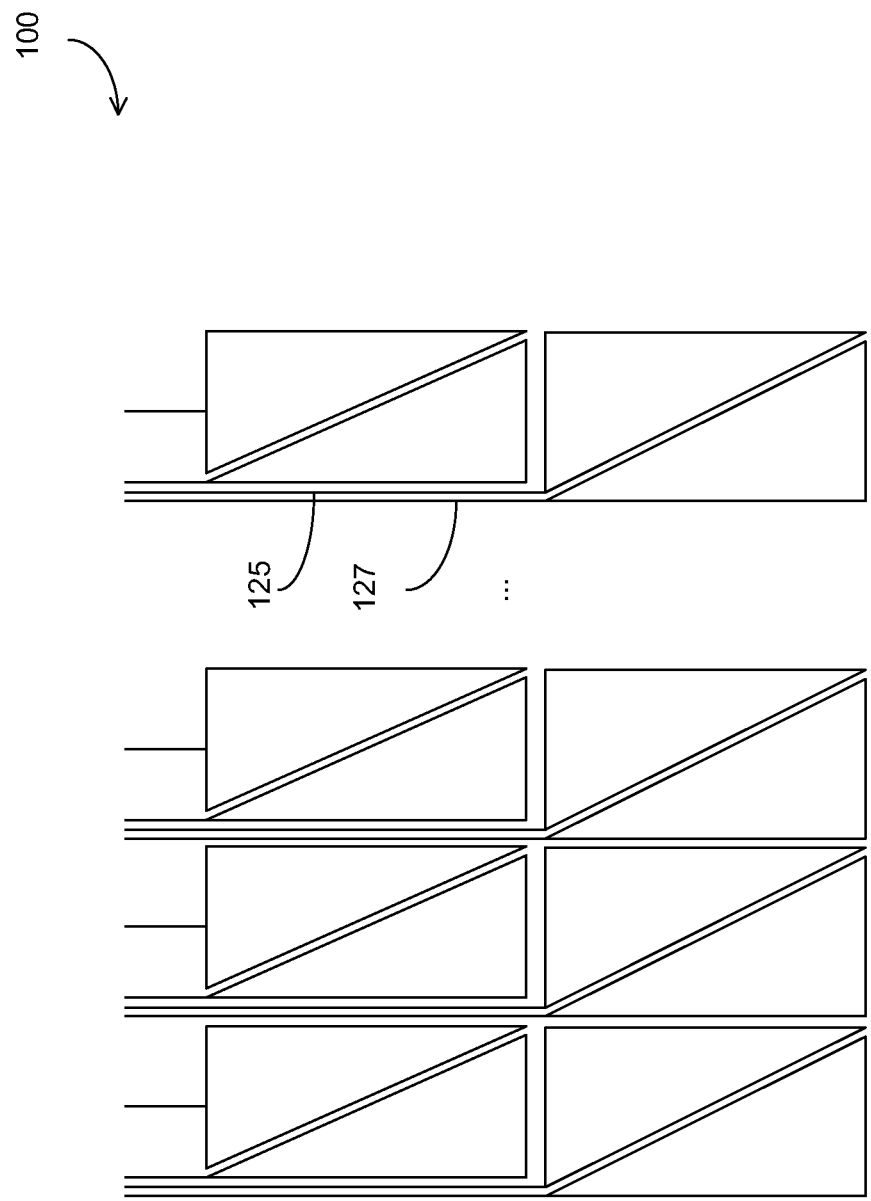
FIG. 2 is a schematic diagram of a sensing electrode according to another embodiment of the present invention.

FIG. 2 shows a schematic diagram of a sensing electrode group 100 according to another embodiment of the present invention. One difference of the sensing electrode group 100 in FIG. 2 from that in FIG. 1 is that, the third conducting wire 125 and the fourth conducting wire 127 in FIG. 1 are respectively routed at two different sides of the first sensing unit, and the third conducting wire 125 and the fourth conducting wire 127 in FIG. 2 are routed at the same side of the first sensing unit. In the embodiment in FIG. 2, the third conducting wire 125 and the fourth conducting wire 127 are routed along the left side of the first sensing unit. In another embodiment, the third conducting wire 125 and the fourth conducting wire 127 are routed along the right side of the first sensing unit.

It should be noted that, the present invention does not limit the third conducting wire 125 and the fourth conducting wire 127 to be routed along a specific side of the first sensing unit. For example, in another embodiment, the third conducting wire 125 and the fourth conducting wire 127 of the first sensing unit pair 110 are routed along the left side of the first sensing unit, and the third conducting wire 125 and the fourth conducting wire 127 of the second sensing electrode unit pair 110 adjacent to the first sensing electrode pair are routed along the right side of the first sensing unit; and vice versa.

Figure 3:
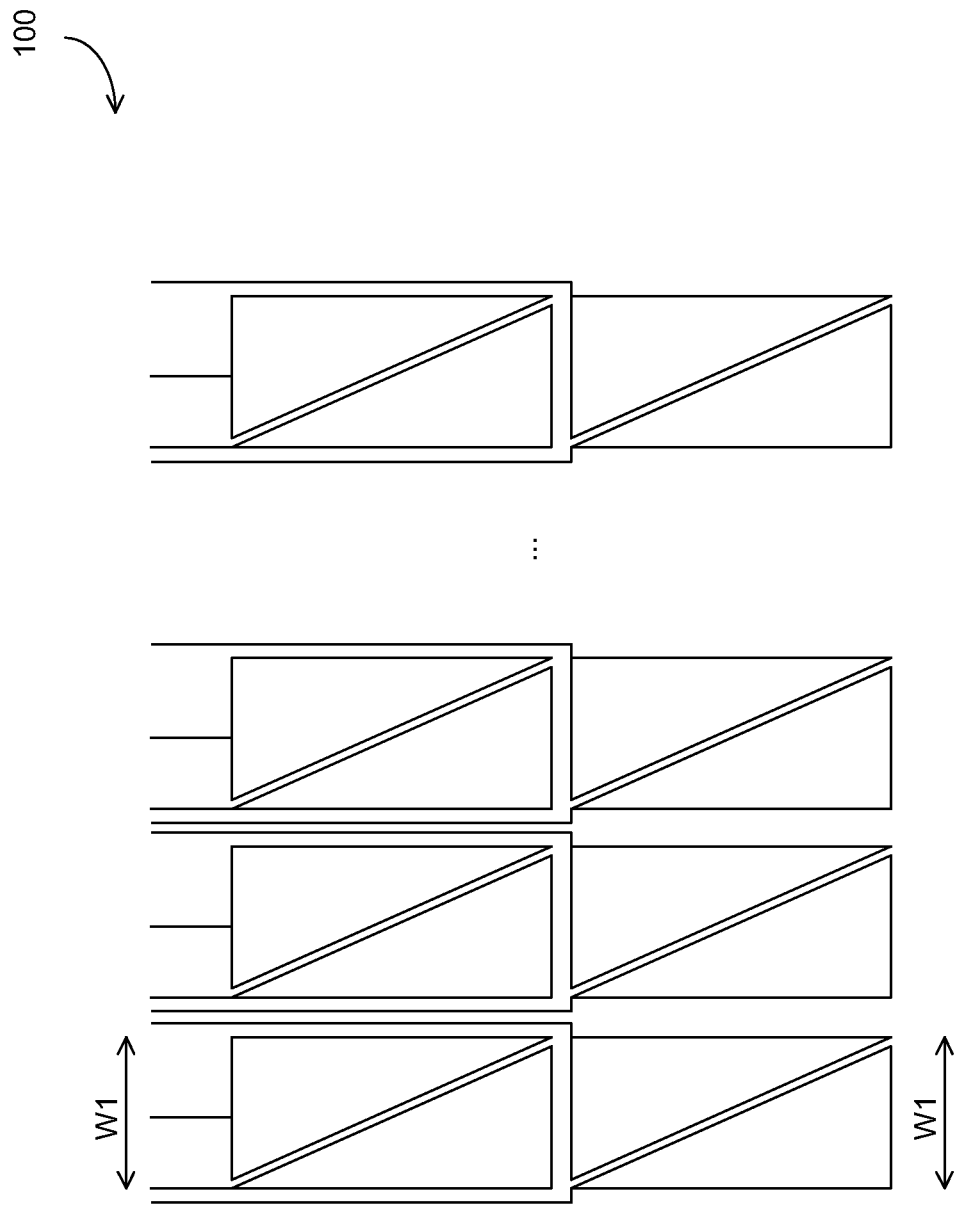
FIG. 3 is a schematic diagram of a sensing electrode according to another embodiment of the present invention.

FIG. 3 shows a schematic diagram of a sensing electrode group 100 according to another embodiment of the present invention. One difference of the embodiment in FIG. 3 from the embodiment in FIG. 1 is that, the width of the second sensing unit in the first direction in the embodiment in FIG. 3, equal to the width of the first sensing unit in the first direction, has a width W1. However, same as the embodiment in FIG. 1, the third conducting wire 125 and the fourth conducting wire 127 of the second sensing unit are respectively routed along two sides of the corresponding first sensing unit.

Figure 4:
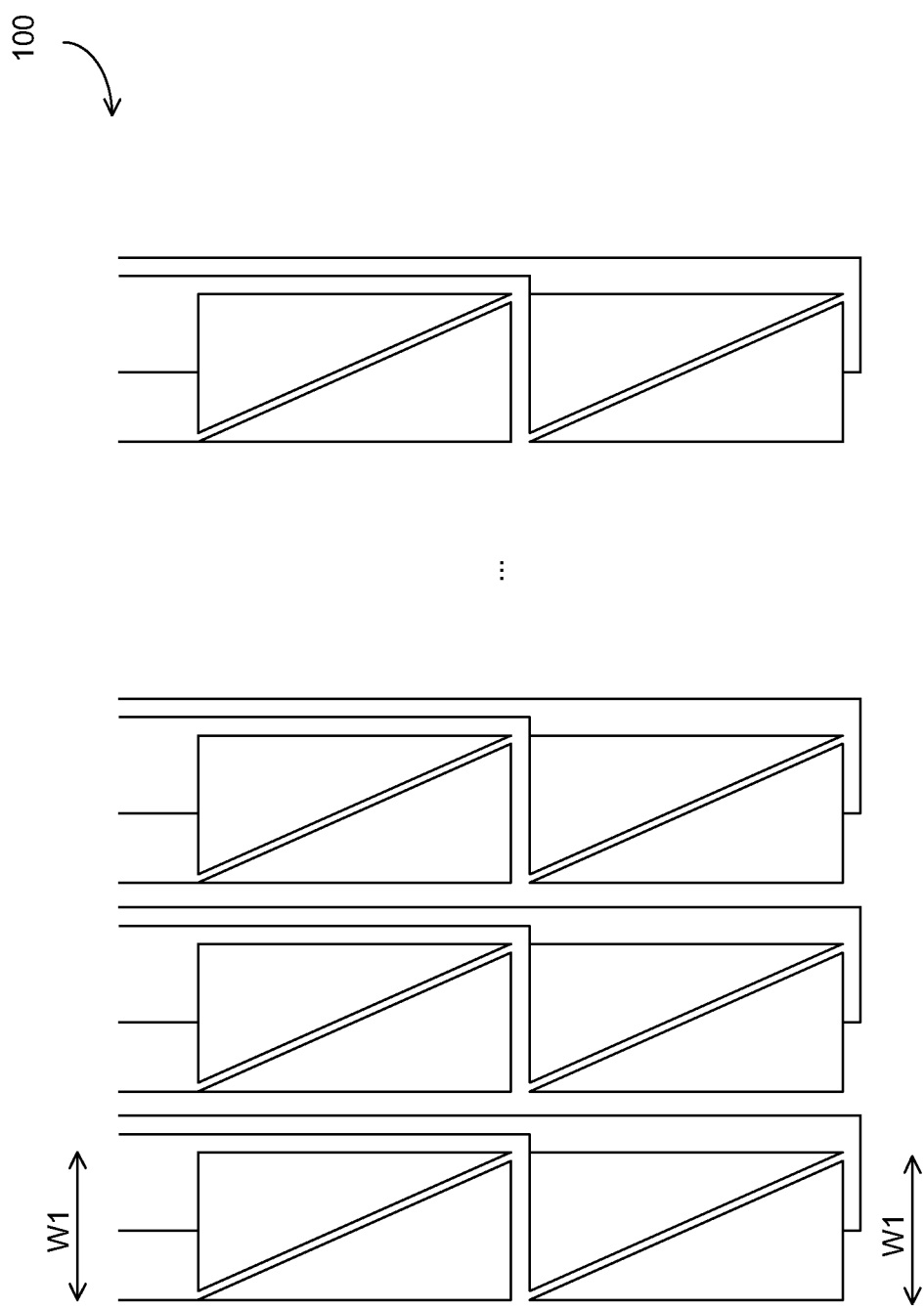
FIG. 4 is a schematic diagram of a sensing electrode according to another embodiment of the present invention.

FIG. 4 shows a schematic diagram of a sensing electrode group 100 according to another embodiment of the present invention. One difference of the embodiment in FIG. 4 from the embodiment in FIG. 1 is that, the width of the second sensing unit in the first direction in the embodiment in FIG. 4, equal to the width of the first sensing unit in the first direction, has a width W1. One difference of the embodiment in FIG. 4 from the embodiment in FIG. 3 is that, the third conducting wire 125 and the fourth conducting wire 127 are routed along the right side of the corresponding first sensing unit. Same as the description associated with the embodiment in FIG. 2, the present invention does not limit the third conducting wire 125 and the fourth conducting wire 127 to be routed along a specific side of the first sensing unit. For example, in another embodiment, the third conducting wire 125 and the fourth conducting wire 127 of the first sensing unit pair 110 are routed along the left side of the first sensing unit, and the third conducting wire 125 and the fourth conducting wire 127 of the second sensing electrode unit pair 110 adjacent to the first sensing electrode pair are routed along the right side of the first sensing unit; and vice versa.

Figure 5:
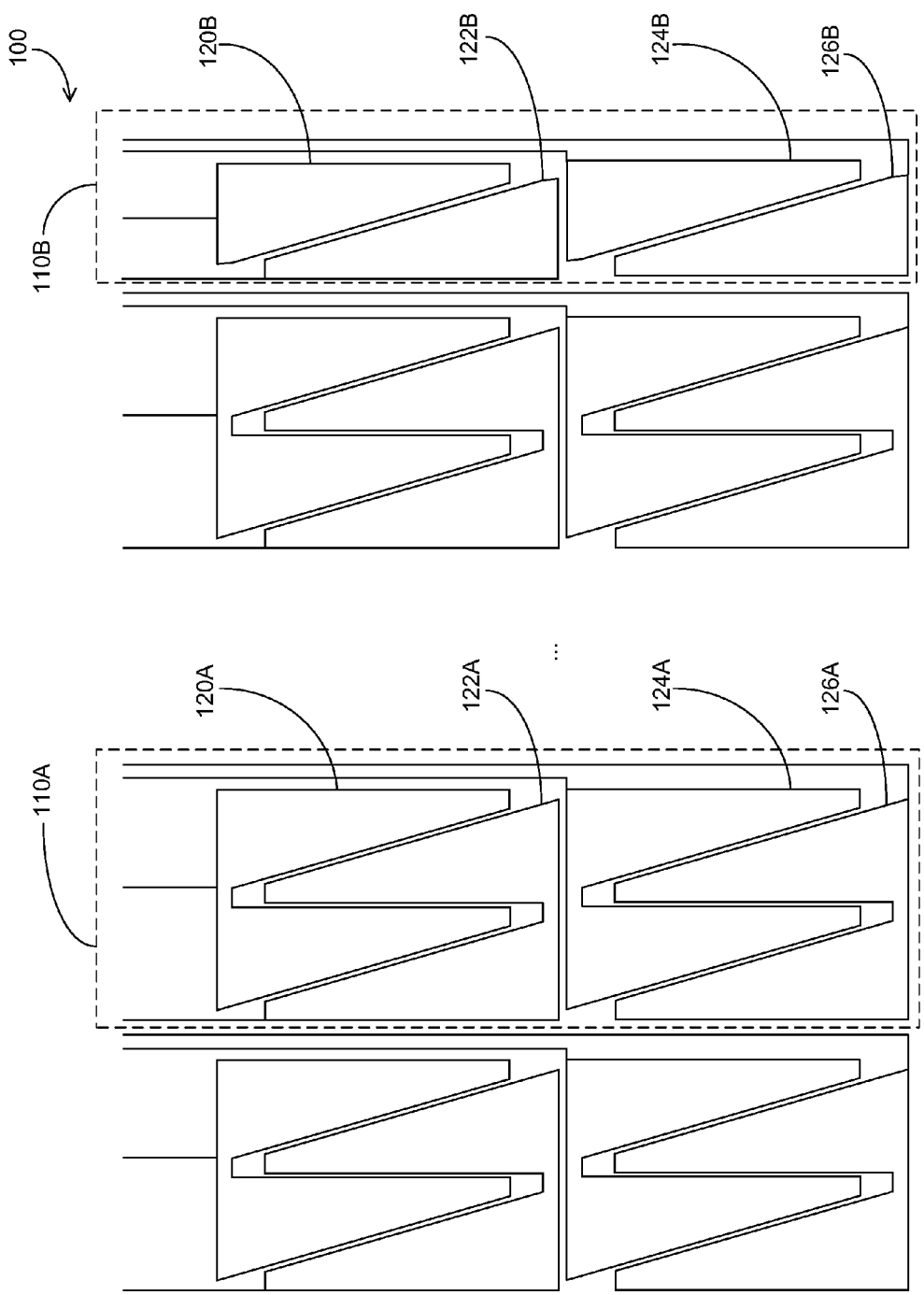
FIG. 5 is a schematic diagram of a sensing electrode according to another embodiment of the present invention.

FIG. 5 shows a schematic diagram of a sensing electrode group 100 according to another embodiment of the present invention. The sensing electrode group 100 includes at least two types of sensing electrode unit pairs 110, e.g., a first sensing electrode unit pair 110A including two electrodes, and a second sensing electrode unit pair 110B having one single electrode. It should be noted that, the width of a substrate may not be an integral multiple of one type of sensing electrode unit pair, and positioning and adjustment may be made at borders. Thus, in one embodiment, the sensing electrode group 100 may include at least two types of sensing electrode unit pairs 110 including different numbers of electrodes. For example, the first sensing electrode unit pair 110A includes M first electrodes 120A, M second electrodes 122A, M third electrodes 124A, and M fourth electrodes 126A; the second sensing electrode pair 110B includes N first electrodes 120B, N second electrodes 122B, N third electrodes 124B and N fourth electrodes 126B. In an example, M may be different from N. In another example, N may be greater than or equal to 1. In the embodiment in FIG. 5, M is equal to 2, and N is equal to 1.

When an external conductive object, e.g., a human finger or a stylus, approaches or contacts (referred to as a proximity event) a range of the first sensing electrode row 130 of the sensing electrode group 100, the third conducting wire 125 and the fourth conducting wire 127 are affected. When the logic circuit of the touch apparatus scans or detects the third conducting wire 125 and the fourth conducting wire 127, capacitance changes of the third conducting wire 125 and the fourth conducting wire 127 are detected. Assuming that there is no proximity object on the corresponding third conducting wire 125 and fourth conducting wire 127, the logic circuit may misjudge that the capacitance changes of the third conducting wire 125 and the fourth conducting wire 127 are from the corresponding third electrode 124 and fourth electrode 126, causing the logic circuit to misjudge an associated position. In conclusion, the third conducting wire 125 and the fourth conducting wire 127 in the range of the first sensing electrode row 130 may affect a determination of a position in the second sensing electrode row 140. Therefore, one feature of the present invention is estimating sensed capacitance values of the third conducting wire 125 and the fourth conducting wire 127, so as to calibrate the sensed capacitance values of the corresponding third electrode 124 and fourth electrode 126 in the second sensing electrode row 140.

Figure 6:
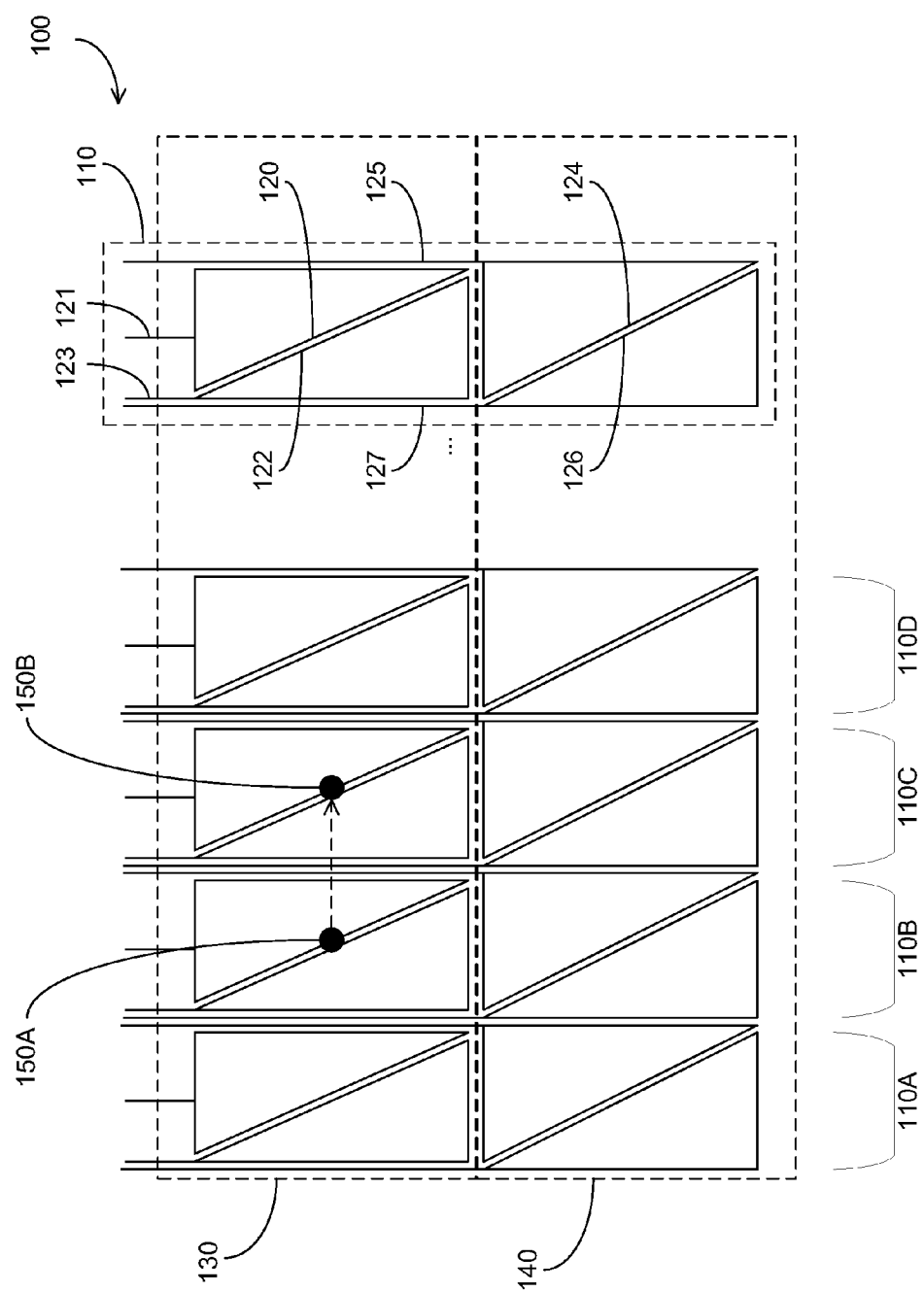
FIG. 6 is a schematic diagram for illustrating the estimation for a sensed capacitance value of a third conducting wire and a fourth conducting wire.

FIG. 6 shows a schematic diagram of estimated sensed capacitance values of the third conducting wire 125 and the fourth conducting wire 127. For illustration purposes, the sensing electrode group 100 in FIG. 6 is identical to the sensing electrode group 100 in FIG. 1. However, the application of the estimation method of the present invention is not limited in the embodiment shown in FIG. 1.

In FIG. 6, four sensing electrode unit pairs 110A to 110D, and a center or a center of gravity representing a proximity event, also referred to as a proximity point, are depicted. In the estimation method of the present invention, the proximity point is moved from a position 150A to a position 150B, so as to observe and record changes in associated parameter ratios. The position 150A is located in the first sensing electrode unit of the sensing electrode unit pair 110b, and has a first-direction or X-axis direction located at the center of the first sensing electrode unit. Similarly, the position 150B is located in the first sensing electrode unit of the sensing electrode unit pair 110C, and has a first-direction or X-axis direction located at the center of the first sensing electrode unit. When the proximity point moves from the position 150A to the position 150B, the proximity point sequentially crosses the third conducting wire 125 of the sensing electrode unit pair 110b and the fourth conducting wire 127 of the sensing electrode unit pair 110C. As previously described, capacitance changes occur on these two conducting wires 125 and 127.

Figure 7:
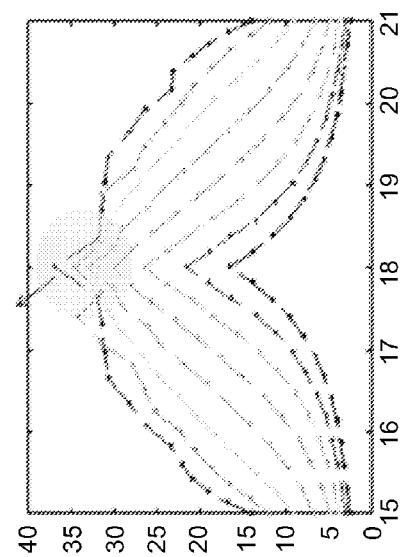
FIG. 7 is a schematic diagram of simulation of sensed capacitance ratios among the first sensing electrodes of the embodiment in FIG. 6.

FIG. 7 shows a schematic diagram of simulation of sensed capacitance ratios among the first sensing electrode units. In FIG. 7, the first direction represents the first direction on the substrate. A middle line of the third conducting wire 125 of the sensing electrode unit pair 110B and the fourth conducting wire 127 of the sensing electrode unit pair 110C falls at a coordinate position 18 of the X-axis. In FIG. 7, the second direction represents the sensed capacitance ratio among the first sensing electrode units. The ratio to the left of the position 18 of the X-axis represents the sensed capacitance ratio of the first sensing electrode unit of the sensing electrode unit pair 110B to the first sensing electrode unit of the sensing electrode unit pair 110A. The ratio to the right of the position 18 of the X-axis represents the sensed capacitance ratio of the first sensing electrode unit of the sensing electrode unit pair 110C to the first sensing electrode unit of the sensing electrode unit pair 110D.

In FIG. 7, there are eight segments respectively representing the sensed capacitance ratios among the sensing electrode unit pairs for different proximity areas. At the coordinate position 18 of the X-axis, the segment having a higher ratio has a smaller proximity area, or represents a proximity point having a smaller radius. Thus, it is observed that, different proximity areas have different ratios of sensed capacitance values. As a proximity area gets closer to the coordinate position 18 of the X-axis or the third conducting wire 125 and the fourth conducting wire 127, the sensed capacitance ratio of the first sensing electrode unit of the sensing electrode unit pair 110B to the first sensing electrode unit of the sensing electrode unit pair 110A gets larger. In contrast, as a proximity area gets closer to the coordinate position 18 of the X-axis or the third conducting wire 125 and the fourth conducting wire 127, the sensed capacitance ratio of the first sensing electrode unit of the sensing electrode unit pair 110C to the first sensing electrode unit of the sensing electrode unit pair 110D gets larger.

In other words, with the simulation data in FIG. 7, the size of a proximity area can be obtained. That is, the X-axis position of the proximity point is calculated, the capacitance change of the corresponding first sensing electrode unit is obtained (learning the first electrode 120 and the second electrode 122 via the first conducting wire 121 and the second conducting wire 12) according to the X-axis position, and the capacitance change of the adjacent first sensing electrode unit is then obtained. Comparing the ratio between the two with the simulation data in FIG. 7, the size of the proximity area can be obtained. Although the sensed capacitance ratios of proximity areas or radiuses of proximity points are represented in form of a graph, one person skilled in the art can understand that the data in FIG. 7 may be stored in a calculator-readable medium in form of a data sheet or other data representation forms for the use of programs executed by the calculator.

Figure 8B:
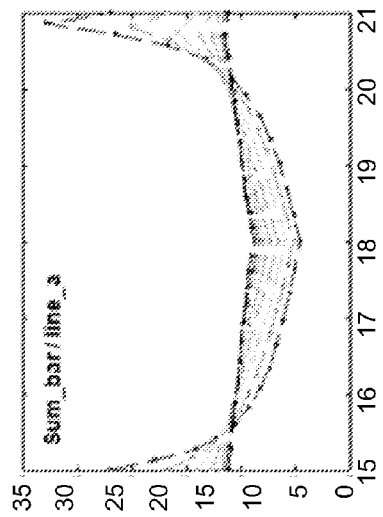
FIG. 8A to FIG. 8C are schematic diagrams of simulation of sensed capacitance ratios of the first sensing electrode units of the embodiment in FIG. 6 corresponding to the third conducting wire and/or the fourth conducting wire.
Figure 8C:
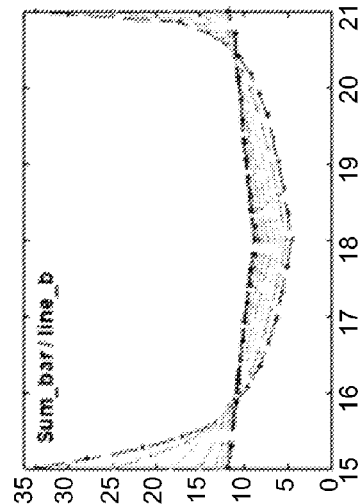
Figure 8A:
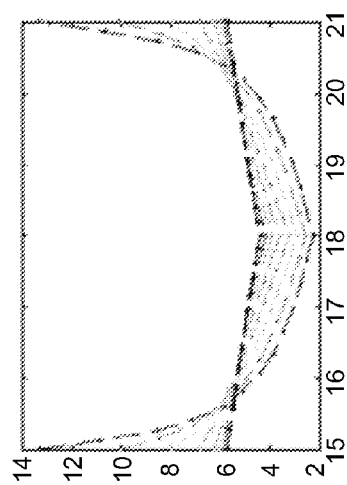

FIG. 8A to FIG. 8C show schematic diagrams of simulation of sensed capacitance ratios of the first sensing electrode unit pair corresponding to the third conducting wire 125 and/or the fourth conducting wire 127. FIG. 8A shows the sensed capacitance ratio of the first sensing electrode unit corresponding to the third conducting wire 125 and the fourth conducting wire 127. FIG. 8B shows the sensed capacitance ratio of the first sensing electrode unit corresponding to the third conducting wire 125. FIG. 8C shows the sensed capacitance ratio of the first sensing electrode unit corresponding to the fourth conducting wire 127. As the third conducting wire 125 and the fourth conducting wire 127 are quite close, these three diagrams appear similar in shape, and only contain changes in the ratios.

After learning the size of the proximity area from FIG. 6, the sensed capacitance ratio of the first sensing electrode unit corresponding to the third conducting wire 125 and/or the fourth conducting wire 127 can be obtained through the simulation data in FIG. 8A to FIG. 8C. Given the sensed capacitance ratio of the first sensing electrode, i.e., the capacitance changes detected by the first electrode 120 and the second electrode 122 are obtained through the first conducting wire 121 and the second conducting wire 123, the capacitance changes may be divided by the ratio to estimate the capacitance change(s) of the third conducting wire 125 and/or the fourth conducting wire 127.

Figure 9A:
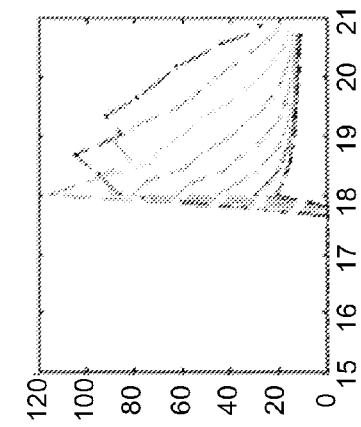
FIG. 9A to FIG. 9D are schematic diagrams of simulation of sensed capacitance ratios of the first sensing electrode units of the embodiment in FIG. 6 corresponding to the third conducting wire and/or the fourth conducting wire.
Figure 9C:
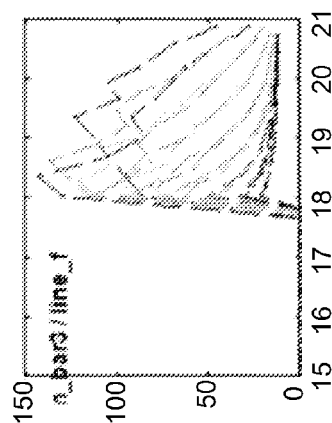
Figure 9B:
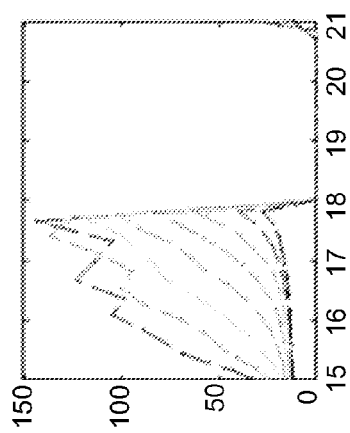
Figure 9D:
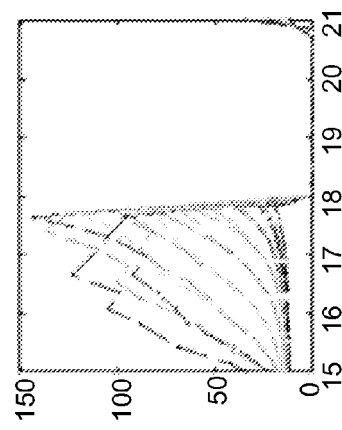

FIG. 9A to FIG. 9D show schematic diagrams of simulation of the sensed capacitance ratios of the first sensing electrode unit corresponding to the third conducting wire 125 and/or the fourth conducting wire 127. FIG. 9A shows the sensed capacitance ratio of the first sensing electrode unit of the sensing electrode unit pair 110B to the third conducting wire 125 of the sensing electrode unit pair 110A. FIG. 9B shows the sensed capacitance ratio of the first sensing electrode unit of the sensing electrode unit pair 110B to the fourth conducting wire 127 of the sensing electrode unit pair 110B. FIG. 9C shows the sensed capacitance ratio of the first sensing electrode unit of the sensing electrode unit pair 110C to the third conducting wire 125 of the sensing electrode unit pair 110C. FIG. 9D shows the sensed capacitance ratio of the first sensing electrode unit of the sensing electrode unit pair 110C to the fourth conducting wire 127 of the sensing electrode unit pair 110D.

Similarly, after learning the size of the proximity area from FIG. 6, the sensed capacitance ratios of the third conducting wires 125 and the fourth conducting wires 127 may be obtained through the simulation data in FIG. 9A to FIG. 9D. The capacitance changes of the first sensing units are then learned through the first conducting wires 121 and the second conducting wires 123, and divided by the above sensing ratios to estimate the capacitance changes of the third conducting wires 125 and the fourth conducting wires 127.

It should be noted that, the capacitance change of each of the third conducting wires 125 may be deduced from the ratios in FIG. 8B, FIG. 9A and FIG. 9C, and the capacitance change of each of the fourth conducting wires 127 may be deduced from the ratios in FIG. 8C, FIG. 9B and FIG. 9D. In one embodiment, the capacitance changes of the third conducting wire 125 and the fourth conducting wire 127 is average values or median values of multiple estimated ratios. One person skilled in the art can understand that, the simulation data in FIG. 8A to FIG. 9D are merely examples. According to an embodiment of the present invention, the capacitance change of the third conducting wire 125 may be estimated according to only one of FIG. 8B, FIG. 9A and FIG. 9C, and the capacitance change of the fourth conducting wire 127 may be estimated according to only one of FIG. 8C, FIG. 9B and FIG. 9D. In addition, a simulation diagram may be drawn from each of the third conducting wires 125 and the fourth conducting wires 127 for each of the sensing electrode units. Thus, one person skilled in the art can understand that, the present invention does not limit the number of sets of simulation data based serving as the basis for obtaining the ratio.

Figure 10A:
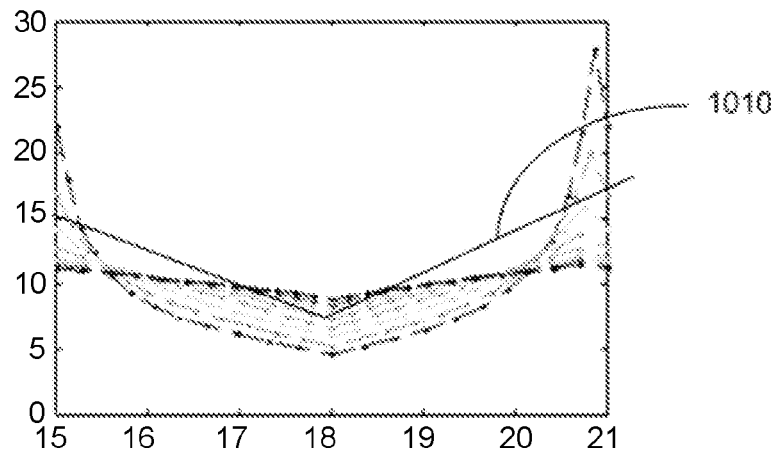
FIG. 10A and FIG. 10B are schematic diagrams of assigned sensed capacitance ratios of the first sensing electrode units of the embodiment in FIG. 6 corresponding to the third conducting wire and/or the fourth conducting wire.
Figure 10B:
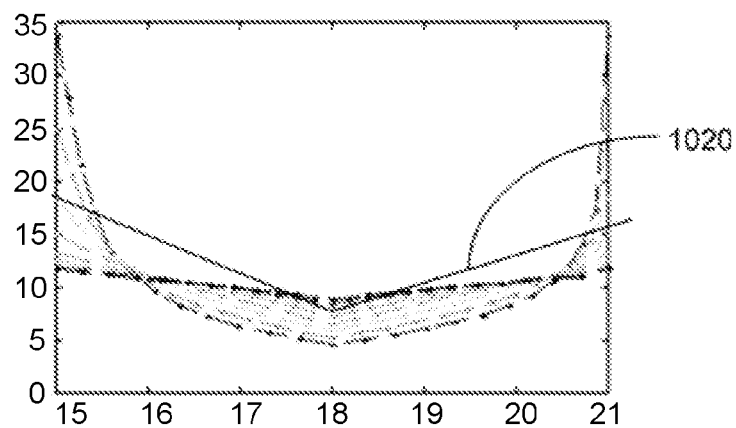

FIG. 10A to FIG. 10B show schematic diagrams of predetermined capacitance change ratio of the first sensing electrode unit in the embodiment in FIG. 6 corresponding to the third conducting wire 125 or the fourth conducting wire 127. The simulation results in FIG. 10A are identical to those in FIG. 8B. For simplifying calculation, a predetermined sensed capacitance ratio 1010 may be given. The simulation results in FIG. 10B are identical to those in FIG. 8C. Also for the sake of calculation simplicity, a predetermined sensed capacitance ratio 1020 may be given. Thus, a complicated look-up procedure or a massive memory space for obtaining or storing the simulation results can be eliminated.

Figure 11A:
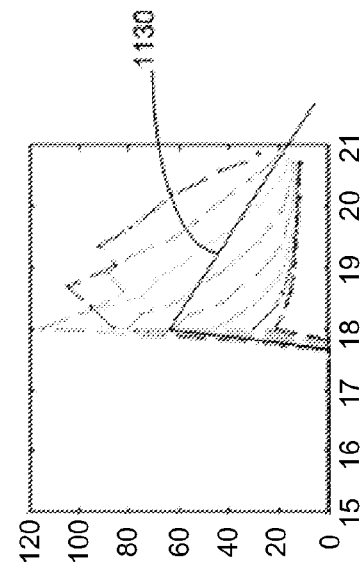
FIG. 11A to FIG. 11D are schematic diagrams of simulation of assigned sensed capacitance ratios of the first sensing electrode units of the embodiment in FIG. 6 corresponding to the third conducting wire and/or the fourth conducting wire.
Figure 11C:
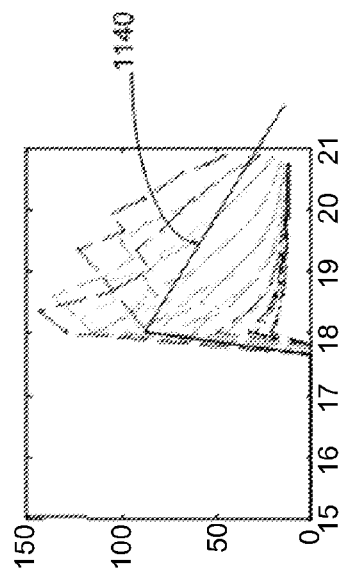
Figure 11B:
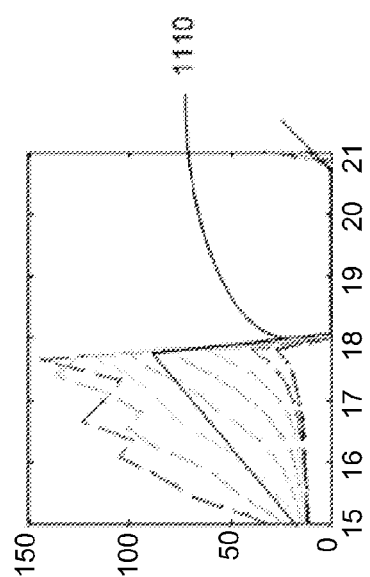
Figure 11D:
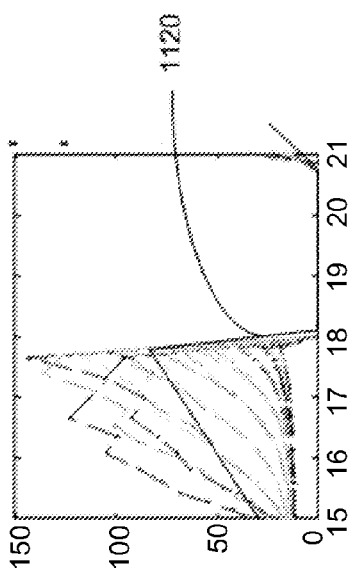

Similarly, FIG. 11A to FIG. 11B are schematic diagrams of simulation of an assigned sensed capacitance ratio of the first sensing electrode unit in the embodiment in FIG. 6 corresponding to the third conducting wire 125 and/or the fourth conducting wire 127. The simulation results in FIG. 11A are identical to those in FIG. 9A. For the sake of calculation simplicity, a predetermined sensed capacitance ratio 1110 may be given, and predetermined sensed capacitance ratios 1120, 1130 and 1140 may also be given.

In other words, in the embodiments in FIG. 10A to FIG. 11D, the predetermined sensed capacitance ratios 1010, 1020, 1110, 1120, 1130 and 1140 are unassociated with the proximity area. Regardless of the size of the proximity area, the assigned sensed capacitance ratio is used to represent the ratio the sensed capacitance value of one first sensing electrode unit to the corresponding third conducting wire 125 or the fourth conducting wire 127. Conversely, when the X-axis coordinate of the proximity event, the capacitance change of one first sensing electrode unit and the predetermined sensed capacitance ratio are known, the sensed capacitance value of the third conducting wire 125 or the fourth conducting wire 127 can be calculated. In one embodiment, the predetermined sensed capacitance ratio includes at least one linear function associated with the X-axis coordinate of the proximity event.

Figure 12:
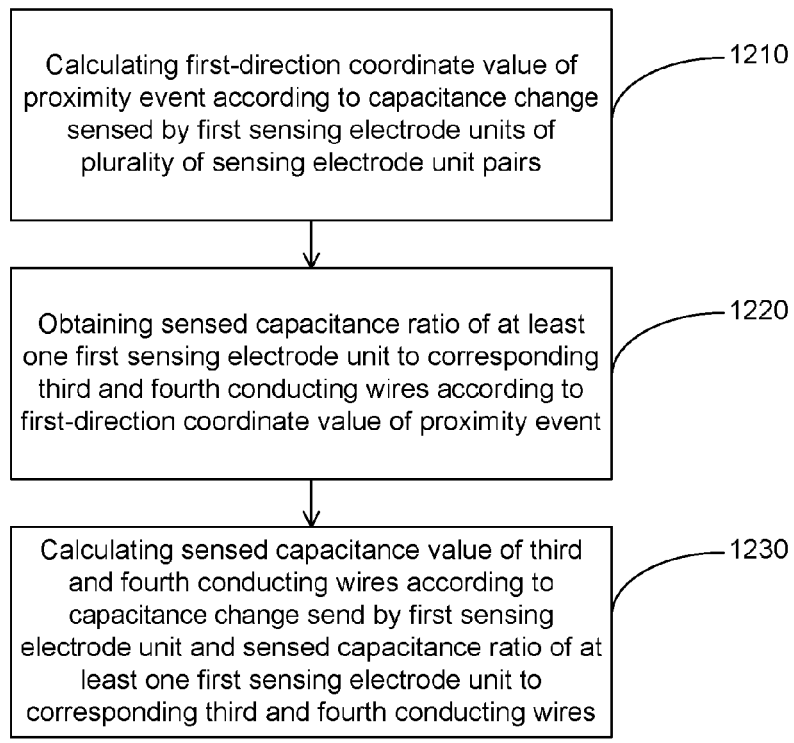
FIG. 12 is a flowchart of an estimation method for sensed capacitance according to an embodiment of the present invention.

Based on the above description, an estimation method is further provided according to an embodiment. FIG. 12 shows a flowchart of a process of an estimation method for sensed capacitance according to an embodiment of the present invention. The estimation method is applied to a sensing electrode formed on a substrate of a touch apparatus. The sensing electrode includes a plurality of sensing electrode unit pairs arranged along a first direction. Each of the sensing electrode unit pairs includes a first sensing electrode unit and a second sensing electrode unit corresponding to the first sensing electrode unit. The second sensing electrode unit includes a third conducting wire and a fourth conducting wire. The first sensing electrode unit and the second sensing electrode unit are arranged along a second direction. The third conducting wire and the fourth conducting wire are arranged along the second direction next to the first sensing electrode unit. The estimation method includes following steps.

In step 1210, a first-direction coordinate value of a proximity event is calculated according to a plurality of capacitance changes sensed by the first sensing electrode units of the sensing electrode unit pairs.

In step 1220, a sensed capacitance ratio of at least one first sensing electrode unit to the corresponding third conducting wire and fourth conducting wire is obtained according to the first-direction coordinate value of the proximity event.

In step 1230, the sensed capacitance value of the third conducting wire and the fourth conducting wire is calculated according to the capacitance change sensed by the at least one first sensing electrode unit and the sensed capacitance ratio of the at least one first sensing electrode unit to the corresponding third conducting wire and fourth conducting wire.

In one embodiment, step 1220 further includes calculating a proximity area of the proximity event according to the first-direction coordinate value of the proximity event, the plurality of sensed capacitance ratios of the first sensing electrode units corresponding to the first-direction coordinate value, and the plurality of capacitance changes of the first sensing electrode units; and calculating the sensed capacitance ratio of the at least one first sensing electrode unit to the corresponding third conducting wire and fourth conducting wire according to the first-direction coordinate value of the proximity event, the proximity area of the proximity event, and the capacitance change of the at least one first sensing electrode unit.

In another embodiment, when the third conducting wire and the fourth conducting wire are routed along the second direction at a same side of the first sensing electrode unit, the estimation method further includes performing sensing/scanning on the sensing electrode units to complete the estimation method. When the third conducting wire and the fourth conducting wire are routed along the second direction at different sides of the first sensing electrode unit, the estimation method further includes performing multiple sensing/scanning on the sensing electrode units to complete the estimation method.

In another embodiment, when the sensed capacitance ratios of multiple first sensing electrode units to the corresponding third conducting wire and fourth conducting wire are obtained, the estimation method further includes calculating the sensed capacitance value of the third conducting wire and the fourth conducting wire according to an average value or a median value of the sensed capacitance ratios of the multiple first sensing electrode units to the corresponding third conducting wire and fourth conducting wire.

Figure 13:
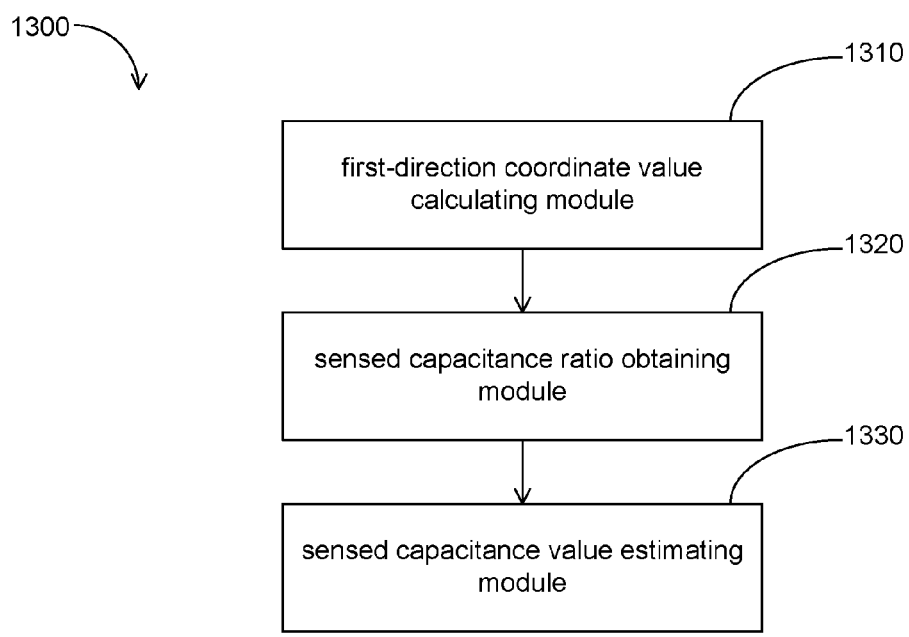
FIG. 13 is a schematic diagram of an estimation apparatus for sensed capacitance according to an embodiment of the present invention.

FIG. 13 shows a schematic diagram of an estimation apparatus 1300 for sensed capacitance according to an embodiment of the present invention. The estimation apparatus 1300 is applied to a sensing electrode formed on a substrate of a touch apparatus. The sensing electrode is identical to the sensing electrode illustrated in the embodiment in FIG. 12. The estimation apparatus 1300 includes: a first-direction coordinate value calculating module 1310, configured to calculate a first-direction coordinate value of a proximity event according to a plurality of capacitance changes sensed by first sensing electrode units of the sensing electrode unit pairs; a sensed capacitance ratio obtaining module 1320, configured to obtain a sensed capacitance ratio of at least one sensing electrode unit to corresponding third conducting wire and fourth conducting wire; and a sensed capacitance value estimating module 1330, configured to calculate a sensed capacitance value of the third conducting wire and the fourth conducting wire according to the capacitance change sensed by the at least one sensing electrode unit, and the sensed capacitance ratio of at least one sensing electrode unit to the corresponding third conducting wire and fourth conducting wire.

In one embodiment, the sensed capacitance ratio obtaining module 1320 is configured to further calculate a proximity area of the proximity event according to the first-direction coordinate value of the proximity event, the sensed capacitance ratios of the plurality of first sensing electrode units corresponding to the first-direction coordinate value, and the capacitance changes of the plurality of first sensing electrode units; and to calculate the sensed capacitance ratio of the at least one first sensing electrode unit to the corresponding third conducting wire and fourth conducting wire according to the first-direction coordinate value of the proximity event, the proximity area of the proximity event, and the capacitance change of the at least one first sensing electrode unit.

In another embodiment, when the sensed capacitance ratio obtaining module 1320 obtains the sensed capacitance ratios of multiple first sensing electrode units corresponding to the third conducting wire and fourth conducting wire, the sensed capacitance estimating module 1330 further calculates the sensed capacitance value of the third conducting wire and the fourth conducting wire according to an average value or a median value of the sensed capacitance ratios of the multiple first sensing electrode units to the corresponding third conducting wire and fourth conducting wire.

In conclusion, the estimation method and apparatus of the present invention are capable of estimating the sensed capacitance value of the third conducting wire and the fourth conducting wire of the second sensing electrode unit at the first sensing electrode row to further compensate a ghost point or a proximity event at the second sensing electrode row.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broad-

What is claimed is:

1. A sensing electrode group, formed on a substrate of a touch apparatus, comprising:
    a plurality of sensing electrode unit pairs arranged along a first axis, each of the sensing electrode unit pairs comprising:
        a first sensing electrode unit, comprising a first electrode connected to a first conducting wire, a second electrode connected to a second conducting wire, wherein the first electrode and the second electrode have a complimentary shape to each other; and
        a second sensing electrode unit, comprising a third electrode connected to a third conducting wire, a fourth electrode connected to a fourth conducting wire, wherein the third electrode and the fourth electrode have a complimentary shape to each other;
    wherein the first sensing electrode unit and the second sensing electrode unit are arranged along a second axis, the first axis and the second axis are perpendicular to each other;
    wherein the first conducting wire, the second conducting wire, the third conducting wire and the fourth conducting wire are routed in a first direction along the second axis;
    wherein the third conducting wire and the fourth conducting wire are routed in a sensing area next to the first sensing electrode unit;
    wherein a first capacitance ratio of the first sensing electrode unit to the third conducting wire and a second capacitance ratio of the first sensing electrode unit to the fourth conducting wire are predetermined for a first-axis coordinate value;
    wherein a third capacitance value of the third conducting wire and a fourth capacitance value of the fourth conducting wire are calculated in accordance with a capacitance change on the first sensing electrode unit, the first capacitance ratio, and the second capacitance ratio.

2. The sensing electrode according to claim 1, wherein the third conducting wire and the fourth conducting wire are routed at two sides of the first sensing electrode unit, respectively.

3. The sensing electrode according to claim 1, wherein the third conducting wire and the fourth conducting wire are routed at a same side of the first sensing electrode unit.

4. The sensing electrode according to claim 1, wherein a width of the second sensing unit in the first axis is greater than a width of the first sensing unit in the first axis.

5. The sensing electrode according to claim 1, wherein a width of the second sensing unit in the first axis is equal to a width of the first sensing unit in the first axis.

6. The sensing electrode according to claim 1, wherein the plurality of sensing electrode unit pairs comprise a first sensing electrode unit pair and a second sensing electrode unit pair, the first sensing electrode unit pair comprises M first electrodes, M second electrodes, M third electrodes and M fourth electrodes; the second sensing electrode unit pair comprises N first electrodes, N second electrodes, N third electrodes and N fourth electrodes; M is not equal to N.

7. The sensing electrode according to claim 6, wherein N is equal to 1.

8. The sensing electrode according to claim 1, wherein the first conducting wire, the second conducting wire, the third conducting wire and the fourth conducting wire connect along the first direction to a logic circuit of the touch apparatus.

9. A sensing electrode unit pair, formed on a substrate of a touch apparatus, comprising:
    a first sensing electrode unit, comprising a first electrode connected to a first conducting wire, a second electrode connected to a second conducting wire, wherein the first electrode and the second electrode have a complimentary shape to each other; and
    a second sensing electrode unit, comprising a third electrode connected to a third conducting wire, a fourth electrode connected to a fourth conducting wire, wherein the third electrode and the fourth electrode have a complimentary shape to each other;
    wherein the first sensing electrode unit and the second sensing electrode unit are arranged along a first axis;
    wherein the first conducting wire, the second conducting wire, the third conducting wire and the fourth conducting wire are routed in a first direction along the first axis;
    wherein the third conducting wire and the fourth conducting wire are routed in a sensing area adjacent to the first sensing electrode unit;
    wherein a first capacitance ratio of the first sensing electrode unit to the third conducting wire and a second capacitance ratio of the first sensing electrode unit to the fourth conducting wire are predetermined for a first-axis coordinate value;
    wherein a third capacitance value of the third conducting wire and a fourth capacitance value of the fourth conducting wire are calculated in accordance with a capacitance change on the at least one first sensing electrode unit, the first capacitance ratio, and the second capacitance ratio.

10. The sensing electrode unit pair according to claim 9, wherein the first conducting wire, the second conducting wire, the third conducting wire and the fourth conducting wire connect along the first direction to a logic circuit of the touch apparatus.

11. An estimation method for sensing capacitance, applied to a sensing electrode formed on a substrate of a touch apparatus, the sensing electrode comprising a plurality of sensing electrode unit pairs arranged along a first axis, each of the sensing electrode unit pairs comprising a first sensing electrode unit connected to a first conducting wire and a second conducting wire and a second sensing electrode unit connected to a third conducting wire and a fourth conducting wire, the first sensing electrode unit and the second sensing electrode unit arranged along a second axis, the first axis is perpendicular to the second axis, the third conducting wire and the fourth conducting wire routed along the second axis in a sensing area adjacent to the first sensing electrode unit; the estimation method comprising:
    calculating a first-axis coordinate value of a proximity event according to a plurality of capacitance changes sensed by the first sensing electrode units;
    obtaining a predetermined first capacitance ratio of at least one first sensing electrode unit to the third conducting wire and a predetermined second capacitance ratio of the first sensing electrode unit to the fourth conducting wire for the first-axis coordinate value of the proximity event; and
    calculating a third capacitance value of the third conducting wire and a fourth capacitance value of the fourth conducting wire in accordance with a capacitance change on the at least one sensing electrode unit, the first capacitance ratio, and the second capacitance ratio.

12. The estimation method according to claim 11, wherein the step of obtaining the third capacitance ratio and the fourth capacitance ratio comprises:
calculating a proximity area of the proximity event according to the first-axis coordinate value of the proximity event, a plurality of capacitance ratios of the first sensing electrode units corresponding to the first-axis coordinate value, and the plurality of capacitance changes of the first sensing electrode units; and
calculating the third capacitance ratio and the fourth capacitance ratio according to the first-axis coordinate value of the proximity event, the proximity area of the proximity event, and the capacitance change of the at least one first sensing electrode unit.

13. The estimation method according to claim 11, wherein when the third conducting wire and the fourth conducting wire are routed along the second axis at a same side of the first sensing electrode unit, the estimation method further comprises performing sensing/scanning on the sensing electrode units to complete the estimation method.

14. The estimation method according to claim 11, wherein the third conducting wire and the fourth conducting wire are routed along the second axis at different sides of the first sensing electrode unit, the estimation method further comprises performing multiple sensing/scanning on the sensing electrode units to complete the estimation method.

15. The estimation method according to claim 11, wherein when the third capacitance ratio and the fourth capacitance ratio are obtained, the estimation method further comprises calculating the third capacitance value and the fourth capacitance value according to an average value or a median value of the third capacitance ratio and the fourth capacitance ratio.

16. An estimation apparatus, applied to a sensing electrode formed on a substrate of a touch apparatus, the sensing electrode comprising a plurality of sensing electrode unit pairs arranged along a first axis, each of the sensing electrode unit pairs comprising a first sensing electrode unit connected to a first conducting wire and a second conducting wire and a second sensing electrode unit connected to a third conducting wire and a fourth conducting wire, the first sensing electrode unit and the second sensing electrode unit arranged along a second axis, the first axis is perpendicular to the second axis, the third conducting wire and the fourth conducting wire routed along the second axis in a sensing area next to the first sensing electrode unit; wherein the estimation apparatus is configured to:
calculate a first-axis coordinate value of a proximity event according to a plurality of capacitance changes sensed by a plurality of the first sensing electrode units of the sensing electrode unit pairs
obtain a predetermined first capacitance ratio of at least one first sensing electrode unit to the third conducting wire and a predetermined second capacitance ratio of the at least one first sensing electrode unit to the fourth conducting wire according to the first-axis coordinate value of the proximity event, and
calculate a third capacitance value of the third conducting wire and a fourth capacitance value of the fourth conducting wire in accordance with a capacitance change on the at least one first sensing electrode unit, the first capacitance ratio, and the second capacitance ratio.

17. The estimation apparatus according to claim 16, wherein the estimation apparatus is configured to further calculate a proximity area of the proximity event according to the first-axis coordinate value of the proximity event, a plurality of capacitance ratios of the first sensing electrode units corresponding to the first-axis coordinate value, and the plurality of capacitance changes of the first sensing electrode units, and to calculate the third capacitance ratio and the fourth capacitance ratio according to the first-axis coordinate value of the proximity event, and the proximity area of the proximity event.

18. The estimation apparatus according to claim 16, wherein when the estimation apparatus obtains a plurality of capacitance ratios the first capacitance ratio and the second capacitive ratio, the estimation apparatus is configured to further calculate the third capacitance value and the fourth capacitance value according to an average value or a median value of the plurality of capacitance ratios.

* * * * *